UNITED STATES PATENT OFFICE.

HANS CHRISTIAN WILHELM HARMSEN, OF LUENEBURG, GERMANY.

PROCESS OF SEPARATING TIN FROM TIN-PLATE WASTE.

SPECIFICATION forming part of Letters Patent No. 485,035, dated October 25, 1892.

Application filed May 4, 1892. Serial No. 431,833. (No specimens.)

*To all whom it may concern:*

Be it known that I, HANS CHRISTIAN WILHELM HARMSEN, doctor of philosophy, a subject of the Emperor of Germany, and a resident of Lueneburg, in the Empire of Germany, have invented new and useful Improvements in Untinning the Waste of Tin-Plates, of which the following is a specification.

The object of my invention consists in separating the tin from tinned waste in a simple, inexpensive, and thorough manner, so that the separated parts can be utilized again with advantage. Different methods have heretofore been employed to attain the same results, but have either been too expensive and too complicated or have produced impure products of tin or iron too much corroded by acids.

My invention of separating the tin from tinned waste consists, chiefly, in the employment of weak acid mixtures which neither affect the purity of the tin products nor corrode the iron, and the process is based upon the following chemical reactions: When metallic tin is subjected to the action of a diluted mixture of sulphuric acid and nitric acid at ordinary temperature, the nitric acid is reduced to ammonia and tin sulphate is formed after the formula:

The tin sulphate is oxidized to tin oxide, if its solution is slowly mixed with diluted nitric acid of a temperature of not less than 195° Fahrenheit, whereby all the tin is precipitated as stannic acid after the formula:

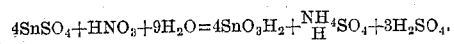

To carry this process into practical operation upon a large scale, I have found by experience the method hereinafter described to work to good advantage.

In a wooden tank of one thousand gallons capacity, (which I will call "tank No. 1,") I prepare at ordinary temperature a mixture of seven hundred gallons of water, seven hundred pounds of sulphuric acid of 50° Baumé, and two hundred pounds of nitric acid of 36° Baumé. Into this mixture I place, preferably in wicker baskets for convenience of handling, from one thousand to one thousand two hundred pounds of tinned waste and let same remain therein until the tin has been dissolved by the mixture (requiring about half an hour) and changed into tin sulphate. The untinned iron waste is then taken out, rinsed off in water, and put away ready for being utilized as other scrap-iron. A similar quantity of tinned waste is immediately put into the tank again and the operation repeated in the manner before described until the acid mixture has become fully saturated and will not dissolve any more tin, which occurs after eight thousand to twelve thousand pounds of waste, according to the quantity of tin thereon, have been untinned.

In order to free the tin held in solution in the acid mixture, I prepare in another tank (which I call "tank No. 2") a mixture consisting of about seventy gallons of water and one hundred and forty pounds of nitric acid of 36° Baumé, and heat it by the introduction of steam to not less than 195° Fahrenheit. The saturated mixture from tank No. 1 is then by a steam-pump or other suitable means conveyed into the tank No. 2. During that time and for about three hours in all the temperature must not be reduced below 195° Fahrenheit, which causes the tin held in solution to be separated and precipitated as stannic acid, ($SnO_3H_2$.) After cooling off the diluted acid remaining on top is drawn off and can be used again in tank No. 1 or can be utilized for the production of sulphate of iron in connection with the untinned iron waste. The stannic acid is easily manipulated into tin oxide, metallic tin, stannate of sodium, or other products of tin.

What I claim, and desire to secure by Letters Patent of the United States, is—

1. The process of freeing the tin held in solution as tin sulphate, as stated, which consists in mixing the said tin sulphate with a heated mixture of nitric acid and water, whereby the dissolved tin is precipitated as stannic acid, substantially as described.

2. The process of utilizing tinned waste, which consists in separating the tin from tinned waste by subjecting the latter to the action of a diluted mixture of sulphuric acid and nitric acid, whereby the iron is freed from the tin and the tin is dissolved into tin sulphate, and bringing the latter into a vessel containing a heated mixture of diluted nitric acid, whereby the dissolved tin is precipitated as stannic acid, as set forth.

In witness whereof I have hereunto set my hand in presence of two witnesses.

HANS CHRISTIAN WILHELM HARMSEN.

Witnesses:
THEODOR STEUDEL,
WILLY ECKERT.